(12) United States Patent
Mieyan

(10) Patent No.: US 10,549,586 B1
(45) Date of Patent: Feb. 4, 2020

(54) ELECTRONIC UNIT FOR MEASURING OPERATING PARAMETERS OF A VEHICLE WHEEL

(71) Applicants: Continental Automotive France, Toulouse (FR); Continental Automotive GmbH, Hannover (DE)

(72) Inventor: Jérémy Mieyan, Saiguede (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/339,134

(22) PCT Filed: Nov. 3, 2017

(86) PCT No.: PCT/FR2017/053013
§ 371 (c)(1),
(2) Date: Apr. 3, 2019

(87) PCT Pub. No.: WO2018/083424
PCT Pub. Date: May 11, 2018

(30) Foreign Application Priority Data

Nov. 4, 2016 (FR) ...................... 16 60706

(51) Int. Cl.
*B60C 23/02* (2006.01)
*B60C 23/04* (2006.01)
*B60C 29/02* (2006.01)

(52) U.S. Cl.
CPC ...... *B60C 23/0494* (2013.01); *B60C 23/0498* (2013.01); *B60C 29/02* (2013.01)

(58) Field of Classification Search
USPC .................................................. 73/146–146.8
See application file for complete search history.

(56) References Cited

U.S. PATENT DOCUMENTS

| 7,886,589 B2 | 2/2011 | Capdepon et al. |
| 2006/0075812 A1* | 4/2006 | Luce ............... B60C 23/0408 |
| | | 73/146.8 |

(Continued)

FOREIGN PATENT DOCUMENTS

| DE | 202016101336 U1 | 3/2016 |
| EP | 1449683 A2 | 8/2004 |
| FR | 2907048 A1 | 4/2008 |

OTHER PUBLICATIONS

English Translation of the Written Opinion for International Application No. PCT/FR2017/053013, dated Feb. 9, 2018—6 pages.

(Continued)

*Primary Examiner* — Andre J Allen
(74) *Attorney, Agent, or Firm* — RatnerPrestia

(57) ABSTRACT

An electronic unit for measuring operating parameters of a vehicle wheel, including an electronic casing; an inflation valve; and elements for attaching the electronic casing and the inflation valve. The elements for attaching the electronic casing and the inflation valve include an insert provided with an axial bore and mounted with the ability to pivot in the continuation of the body of the inflation valve; a sleeve secured to the electronic casing, designed to be mounted with the ability to slide around the insert, a way of assembling the sleeve of the electronic casing and the insert of the valve body; and a spring-effect elastic.

12 Claims, 2 Drawing Sheets

(56) References Cited

U.S. PATENT DOCUMENTS

| | | | |
|---|---|---|---|
| 2007/0113637 A1* | 5/2007 | Blossfeld | B60C 23/0408 |
| | | | 73/146.8 |
| 2007/0295076 A1* | 12/2007 | Blossfeld | B60C 23/0408 |
| | | | 73/146.8 |
| 2009/0007649 A1* | 1/2009 | Kempf | B60C 23/0408 |
| | | | 73/146.8 |
| 2012/0312389 A1* | 12/2012 | Kempf | B60C 23/0408 |
| | | | 137/227 |
| 2013/0087262 A1* | 4/2013 | Hennig | B60C 23/00 |
| | | | 152/417 |
| 2014/0283923 A1* | 9/2014 | Kempf | B60C 23/0494 |
| | | | 137/227 |
| 2019/0030966 A1 | 1/2019 | Dementyev et al. | |

OTHER PUBLICATIONS

International Search Report and Written Opinion for International Application No. PCT/FR2017/053013, dated Feb. 9, 2018—8 pages.

* cited by examiner

ELECTRONIC UNIT FOR MEASURING OPERATING PARAMETERS OF A VEHICLE WHEEL

CROSS REFERENCE TO RELATED APPLICATIONS

This application is the U.S. National Phase Application of PCT International Application No. PCT/FR2017/053013, filed Nov. 3, 2017, which claims priority to French Patent Application No. 1660706, filed Nov. 4, 2016, the contents of such applications being incorporated by reference herein.

FIELD OF THE INVENTION

The present invention relates to an electronic unit for measuring operating parameters of a vehicle wheel, comprising an electronic casing and an inflation valve for securing said electronic casing to a wheel rim.

BACKGROUND OF THE INVENTION

Motor vehicles are increasingly being fitted with systems for monitoring and/or measuring parameters, comprising sensors mounted on said vehicle.

By way of example of such systems, mention may be made of the monitoring systems that comprise electronic casings mounted on each of the wheels of vehicles, these being dedicated to measuring parameters, such as pressure and/or temperature of the tires with which these wheels are fitted, and intended to inform the driver of any abnormal variation in the measured parameter.

One of the current solutions most commonly used for attaching the electronic casings to the wheel rims is to make electronic units each made up of an electronic casing and of an inflation valve assembled with said electronic casing, that allows the latter to be secured to the rim of the wheel.

In addition, each electronic casing then conventionally comprises an external "eyelet", and each inflation valve comprises a body intended to extend through the eyelet and through an orifice made in the rim, and an assembly head separated from the body by a shoulder that constitutes a face via which the eyelet and said inflation valve are immobilized against said rim.

Such a design makes it possible to obtain a tightening torque that is capable of correctly retaining the electronic casings in spite of the significant loadings (centrifugal force, vibrations, accelerations . . . ) to which these casings are subjected.

However, during the operations of mounting the tire on the rim of the wheel of the vehicle and removing it therefrom, the tire passes over the electronic casing and the rigid connection between the valve and the electronic casing breaks under the stress loadings applied by said tire.

As a result, it is necessary to be able to press the electronic casing firmly against the bottom of the rim so as to create contact between said casing and said rim so as to be able to withstand the forces applied by the tire during the operations of fitting same on and removing same from the rim, and thereby avoid breaking the electronic unit at the rigid connection between the electronic casing and the valve.

In order to ensure this contact between the electronic casing and the bottom of the rim', electronic units have been proposed that comprise an electronic casing and a valve that are configured in such a way as to be able to adapt to the angular orientation between the electronic casing and the valve so that said electronic casing can be pressed firmly against the bottom of the rim, regardless of the profile and dimensions of said rim, before the electronic unit is fixed to the rim.

In general, in order to achieve this orientable angular connection, the electronic casing and the valve of the electronic unit comprise connecting elements of complementing shapes so as to generate a pivot connection. The valve is then inserted into the valve hole provided in the rim, then the electronic casing is rotated about the pivot connection. The angular orientation obtained in order to achieve contact between the electronic casing and the bottom of the rim is then blocked in position by friction as a nut is tightened, allowing the electronic unit to be fixed rigidly to the rim.

For example, document FR 2 907 048, incorporated herein by reference, describes an electronic unit for measuring operating parameters of a vehicle wheel, comprising an electronic casing and an inflation valve for securing said electronic casing to a wheel rim, comprising a body intended to extend through an orifice formed in the rim, and an assembly head separated from the body by a shoulder that constitutes a face via which said inflation valve is immobilized against said rim. The electronic casing comprises an exterior wall defining a lateral housing for the inflation valve assembly head, delimited by a metal plate made as one piece with said electronic casing, against which the immobilizing face of said assembly head bears, and provided with a cutout for the passage of the body of said inflation valve.

The metal plate and the immobilizing face of the assembly head have cylindrical contacting faces, allowing the inclination of the electronic casing with respect to the longitudinal axis of the inflation valve to be adjusted before the latter is immobilized against the rim. Such an articulation makes it possible to adjust the position of the electronic casings to suit the profiles of the rims, notably with a view to keeping said electronic casings in contact with the bottom of the rim and thereby to limiting the loadings experienced.

However, this solution has a number of disadvantages.

Specifically, when mounting the electronic unit on the rim, the operator therefore has to orient the electronic casing with respect to the valve until he achieves contact between the casing and the bottom of the rim, and keep said casing in contact with the rim while tightening the nut, something which is a complicated maneuver which does not make it possible to guarantee the desired contact.

In addition, this solution proves expensive because, in addition to the high price of the inflation valves, which are generally all-metal, it entails the production of ancillary components (nuts, seals, . . . ) which are especially designed to ensure this angularly adaptable connection.

SUMMARY OF THE INVENTION

An aspect of the present invention proposes an electronic unit for measuring operating parameters of a vehicle wheel, comprising an electronic module casing and an inflation valve, that seeks to alleviate these disadvantages and has the key objective of providing an electronic unit capable of withstanding significant loadings, notably during the operations of fitting a tire on the rim of the wheel of the vehicle and removing same therefrom.

According to an aspect of the invention, an electronic unit for measuring operating parameters of a vehicle wheel, comprises:
   an electronic casing configured to house the control electronics of the electronic measurement unit;

an inflation valve configured to allow said electronic measurement unit to be fixed, to a rim of a wheel of a vehicle; and elements for attaching the electronic casing and the inflation valve;

this electronic unit being notable in that the elements for attaching the electronic casing and the inflation valve comprise:

an insert provided with an axial bore and with lateral orifices, which is mounted with the ability to pivot in the continuation of the body of the inflation valve;

a sleeve secured to the electronic casing, designed to be mounted with the ability to slide around the insert, a means of assembling the sleeve of the electronic casing and the insert of the valve body;

a spring-effect elastic element configured to:
ensure a predetermined angular orientation between the electronic casing and the inflation valve when said elastic means is at rest:

allow relative angular movement between said electronic casing and said inflation valve when a stress loading is applied to said electronic unit;

provide return to the predetermined angular orientation between said electronic casing and said inflation valve when no stress loading is applied to said electronic unit.

The electronic unit according to an aspect of the invention affords several beneficial advantages. In particular:

the elastic means of the means for attaching the electronic casing and the inflation valve allow automatic contact between said electronic casing and the bottom of the rim, without human intervention, as the electronic unit is mounted on the rim;

it adapts to all shapes and dimensional characteristics of rim.

According to one exemplary embodiment, the inflation valve is an inflation valve of the "snap-in" type, comprising:

a valve body made of an elastomer material, provided with a longitudinal axial bore and intended to extend through an orifice made in the rim, said valve body being made up of an elastically deformable trunk and of an abutment head for butting against the rim, which head is separated from the trunk by a neck designed to become positioned in an airtight manner in the orifice made in said rim, and a hollow tubular core made of a rigid material, housing a shut-off mechanism and of dimensions suited to being housed in the bore of the valve body and to extending on each side in the continuation of said valve body, said tubular core being made up of two longitudinal portions arranged with respect to one another and relative to the valve body in such a way as to allow the trunk elastic deformation suited to allowing the inflation valve to be mounted through the orifice in the rim, According to one exemplary embodiment, the inflation valve is an inflation valve of the "clamp-in" type, comprising:

a valve body made of a metallic material, provided with a longitudinal axial bore and intended to extend through an orifice made in the rim, said valve body comprising an abutment head for butting against the rim, which head is separated from the trunk by a seal allowing the valve body to be positioned in an airtight manner in the orifice made in said rim, and a clamping nut allowing the inflation valve to be fixed in the orifice formed in said rim.

The electronic unit according to an aspect of the invention offers the beneficial advantage, because of its special connection between the electronic casing and the inflation valve, of being adaptable to suit rigid valves of the "clamp-in" type just as easily as to suit flexible valves of the "snap-in" type.

According to one advantageous exemplary embodiment, the spring-effect elastic means consists of a spring.

According to one advantageous exemplary embodiment, the spring is fixed, on the one hand, to the frontal face of the abutment head of the inflation valve that is positioned facing the electronic casing and, on the other hand, to the pivoting insert.

According to one preferred exemplary embodiment, the spring works in compression.

According to another exemplary embodiment, the spring works in tension.

According to one preferred and advantageous exemplary embodiment, the spring-effect elastic means consists of an elastomer ring.

According to one advantageous exemplary embodiment, the elastomer ring is formed by overmolding the pivoting insert.

According to one advantageous exemplary embodiment, the means of assembling the sleeve of the electronic casing and the insert of the valve body consists of a screw.

This feature affords rigid assembly between the electronic casing and the inflation valve.

BRIEF DESCRIPTION OF THE DRAWINGS

Other objects, features and advantages of aspects of the present invention will become apparent from the following description, provided by way of non-limiting example with reference to the appended drawings, in which.

DETAILED DESCRIPTION OF THE PREFERRED EMBODIMENTS

Figure 1:
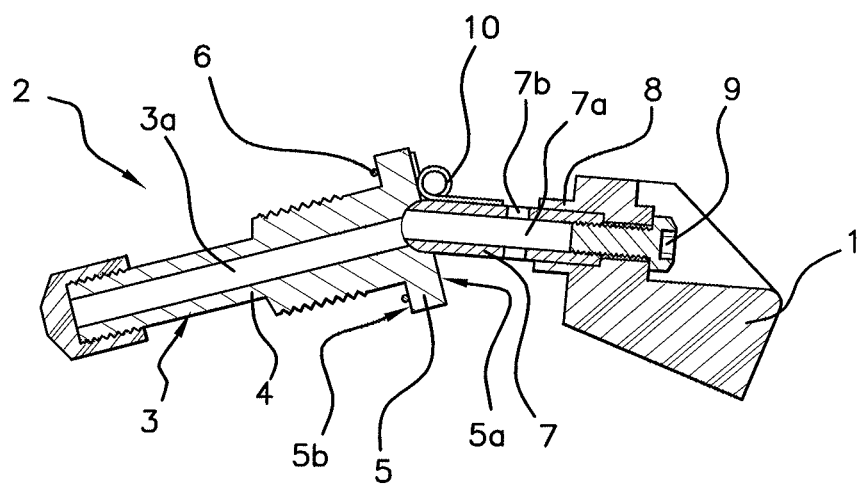
FIG. 1 is a view of schematic nature of a first exemplary embodiment of an aspect of the invention.

In this description, the terms "distal" and "proximal" are used with reference to the position of the elements that make up the electronic unit according to an aspect of the invention when this unit is mounted on the rim of a wheel of a vehicle, the term "proximal" referring to elements closest to the tire, so that the term "distal" then refers to that which is furthest from the tire.

An aspect of the present invention relates to an electronic unit for measuring operating parameters of a vehicle wheel.

As is known per se, this electronic unit is made up of an electronic casing 1 designed to be mounted inside the casing of a tire, and of an inflation valve 2 for securing this to the rim J of the wheel fitted with this tire.

In the first place, the inflation valve 2 comprises a valve body 3 pierced axially with a cylindrical longitudinal bore 3a.

In the conventional way, this valve body 3 is also subdivided, longitudinally, into a trunk 4 which, at its proximal end, has an abutment head 5 delimited by a frontal face 5a and a rear abutment face 5b. This rear face 5b, intended to be brought into contact with the rim 3 as the valve body 3 passes through a hole provided for this purpose in the rim, may have an annular groove able to accept a seal 6.

The distal end of the valve trunk 4 is equipped with a screw thread intended for screwing a protective cap on in the continuation of said trunk 4 of the valve body 3.

The electronic casing 1 of the electronic unit is for its part made up of a hollow casing intended to house the control "electronics" of the electronic unit according to an aspect of the invention. The electronic casing 1 is for example produced by molding in plastic.

Elements referred to as securing elements provide attachment of said electronic casing 1 and said inflation valve 2. These securing elements comprise:
- an insert 7;
- a sleeve 8;
- a means 9 of assembling the sleeve 4 and the insert 3;
- a spring-effect elastic means 10, 11.

The insert 7, for example made of metal, is mounted at the proximal end of the inflation valve 2, on the frontal face 5a of the abutment head 5. The connection between the insert 7 and the inflation valve 2 is a connection of the ball-joint type, allowing relative angular movement between the insert 7 and the inflation valve 2. This insert 7 is provided with an axial bore 7a positioned in the continuation of the bore 3a of the valve body 3 and with lateral orifices 7b thus allowing the flow of inflation air to pass into the tire.

The sleeve 8 is secured to the electronic casing 1 and is designed to be mounted with the ability to slide around the insert 7. The sleeve 8 may also form an integral part of the electronic casing 1.

The means 9 of assembling the sleeve 8 of the electronic casing 1 and the insert 7 consists for example of a screw. In that way, the electronic casing 1, via its sleeve 8, and the inflation valve 2, via the insert 7, are securely attached.

Figure 2:
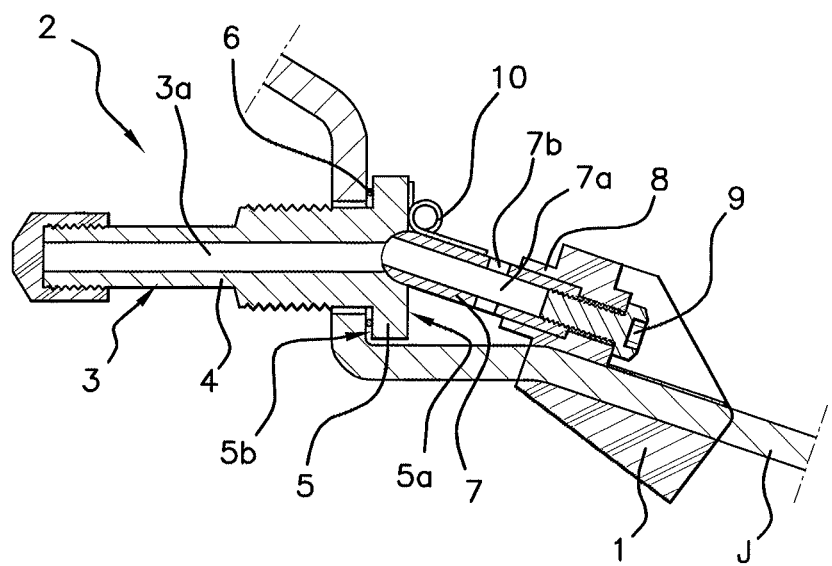
FIG. 2 is a view of schematic nature depicting a conceptual view illustrating the interference-fit mounting of the first embodiment of the electronic unit according to an aspect of the invention mounted on a wheel rim.
Figure 3:
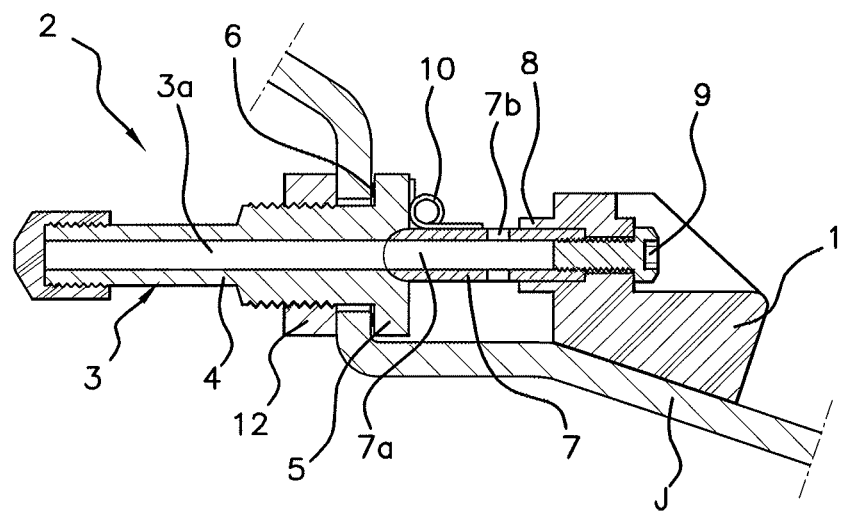
FIG. 3 is a view of a schematic nature of the electronic unit according to the first embodiment mounted on a wheel rim.

According to one first exemplary embodiment, illustrated in FIGS. 1 to 3, the spring-effect elastic means consists of a spring 10. This spring is fixed, on the one hand, to the frontal face 5a of the abutment head 5 of the inflation valve 2 intended to be positioned facing the electronic casing 1 and, on the other hand, to the pivoting insert 7. These fixings of the spring 10 are achieved by any means known per se. This spring 10 may work either in compression or in tension.

Figure 4:
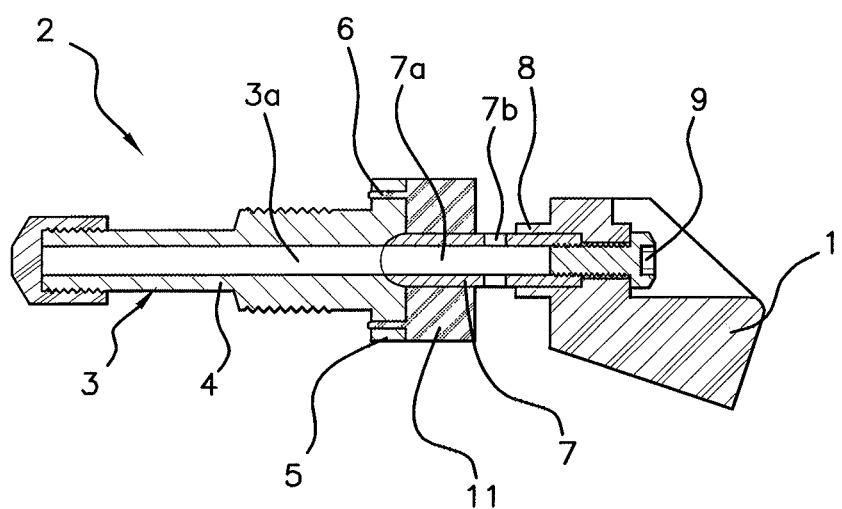
FIG. 4 is a view of schematic nature of a second exemplary embodiment of the electronic unit according to an aspect of the invention.

In the embodiment illustrated in FIG. 4, the spring-effect elastic means consists of an elastomer ring 11 fixed to the inflation valve 2 by any means known per se. According to a first embodiment, the spring-effect component thus formed is created for example by overmolding the insert 7 in rubber in the form of the ring 11 directly on the frontal face 5a of the abutment head 5 of the inflation valve 2. According to another embodiment, the overmolding of the insert 7 with the ring 11 is performed during a distinct step before being fixed on the frontal face 5a of the abutment head 5 of the inflation valve 2, for example by adhesive bonding.

The pair 7-10 or 7-11 created by the insert 7 and the spring-effect elastic means 10 or 11 provides a predetermined angular orientation a between the electronic casing 1 (notably its longitudinal axis A-A determined by the sleeve 8 secured to the insert 7 via the screw 9) and the inflation valve 2 (notably the axis B-B of its valve body 3) at the ball-joint connection between the pivoting insert 7 and the abutment head 5 when said spring-effect elastic means 10, 11 is in the rest position.

This predetermined angular orientation a is such that the electronic casing 1 is an interference fit. As the conceptual view illustrated in FIG. 2 shows, that means that when the spring-effect elastic means 10, 11 is at rest, the angular orientation between the electronic casing 1 and the inflation valve 2 is such that, as the electronic unit according to an aspect of the invention is mounted on a rim J, the spring-effect elastic means 10, 11 of the means of attaching the electronic casing 1 and the inflation valve 2 always allows automatic contact of said electronic casing 1 against the bottom of the rim 3, without human intervention, the spring-effect elastic means 10, 11 then always being subjected to a stress loading that deforms it away from its rest position.

The spring-effect elastic means 10, 11 allows freedom of relative pivoting between the electronic casing 1 and the inflation valve 2 such that the electronic measurement unit according to an aspect of the invention is adapted to suit all shapes and dimensional characteristics of rim.

When a stress loading is applied the electronic unit according to an aspect of the invention, this results in a relative angular movement between the electronic casing 1 and the inflation valve 2 at the pivot connection between the insert 7 and the abutment head 5. The spring effect of the spring-effect elastic means 10, 11 then ensures return to the predetermined angular orientation a between said electronic casing 1 and said inflation valve 2 when no stress loading is applied to the electronic unit according to an aspect of the invention.

Thus, when the vehicle moves, the electronic casing 1, subjected to the action of centrifugal force, may lift so that it is no longer in contact with the bottom of the rim J. Thus, when the vehicle stops, the spring-effect elastic means 7-10 or 7-11 allows the electronic casing 1 to be brought back to bear against the bottom of the rim J. In that way, during the operations of fitting or removing the tire (which are operations during which the vehicle is quite obviously stationary), there is no risk of ripping out the electronic casing 1 of the electronic measurement unit according to an aspect of the invention as the latter is properly securely pressed against the bottom of the rim J.

In order to mount the electronic unit on a rim J, the annular seal 6 is positioned around the trunk 4 of the valve body 3 against the rear face 5b of the abutment head 5 so that it can be compressed between the rim J and the abutment head 5 after said valve body 3 has been inserted in a bore formed in the conventional way in said rim. This annular seal may be (at least partially) contained in a groove (not depicted) created in the rear face 5b of the abutment head 5.

The spring-effect component thus makes it possible automatically to adjust the inclination of the electronic casing 1 according to the angle defined by the profile of the rim J, so as to keep said electronic casing pressed firmly against the bottom of the rim J, and thus limit the stress loadings experienced as a tire is being fitted onto or removed from said rim.

Finally, the immobilizing of the electronic unit on the rim J is afforded by means of a (metal) nut 12 screwed onto a threaded portion (not depicted) of the valve body 3.

In the above description, the inflation valve 2 described and illustrated is an inflation valve of the "clamp-in" type, comprising:
- the valve body 3 is made of a metallic material, provided with a longitudinal axial bore 3a and intended to extend through an orifice made in the rim J, said valve body 3 comprising an abutment head 5 for butting against the rim 3, which head is separated from the trunk 4 by a seal 6 allowing the valve body 3 to be positioned in an airtight manner in the orifice made in said rim J, and a clamping nut 12 allowing the inflation valve 2 to be fixed in the orifice formed in said rim J.

However, the electronic unit according to an aspect of the invention affords the beneficial advantage of being able to be adapted to any type of inflation valve. Hence, according to one exemplary embodiment which has not been illustrated, the inflation valve 2 is an inflation valve of the "snap-in" type.

In the conventional way, a "snap-in" valve comprises:

a valve body made of an elastomer material, provided with a longitudinal axial bore and intended to extend through an orifice made in the rim, said valve body being made up of an elastically deformable trunk and of an abutment head for butting against the rim, which head is separated from the trunk by a neck designed to become positioned in an airtight manner in the orifice made in said rim, and a hollow tubular core made of a rigid material, housing a shut-off mechanism and of dimensions suited to being housed in the bore of the valve body and to extending on each side in the continuation of said valve body, said tubular core being made up of two longitudinal portions arranged with respect to one another and relative to the valve body in such a way as to allow the trunk elastic deformation suited to allowing the inflation valve to be mounted through the orifice in the rim, thus not requiring any nut as is required for the "clamp-in" valve.

The invention claimed is:

1. An electronic unit for measuring operating parameters of a vehicle wheel, comprising:
    an electronic casing configured to house control electronics of the electronic measurement unit;
    an inflation valve configured to allow said electronic measurement unit to be fixed to a rim of a wheel of a vehicle; and
    elements for attaching the electronic casing and the inflation valve;
wherein the elements for attaching the electronic casing and the inflation valve comprise:
    an insert provided with an axial bore and with lateral orifices, which is mounted with the ability to pivot in a continuation of the body of the inflation valve;
    a sleeve secured to the electronic casing, designed to be mounted with the ability to slide around the insert,
    a means of assembling the sleeve of the electronic casing and the insert of the valve body;
    a spring-effect elastic means configured to:
        ensure a predetermined angular orientation between the electronic casing and the inflation valve when said elastic means is at rest:
        allow relative angular movement between said electronic casing and said inflation valve when a stress loading is applied to said electronic unit; and
        provide return to the predetermined angular orientation between said electronic casing and said inflation valve when no stress loading is applied to said electronic unit.

2. The electronic unit as claimed in claim 1, wherein the inflation valve is an inflation valve of the "snap-in" type, comprising:
    a valve body made of an elastomer material, provided with a longitudinal axial bore and intended to extend through an orifice made in the rim, said valve body being made up of an elastically deformable trunk and of an abutment head for butting against the rim, which head is separated from the trunk by a neck designed to become positioned in an airtight manner in the orifice made in said rim,
    and a hollow tubular core made of a rigid material, housing a shut-off mechanism and of dimensions suited to being housed in the bore of the valve body and to extending on each side in the continuation of said valve body, said tubular core being made up of two longitudinal portions arranged with respect to one another and relative to the valve body in such a way as to allow the trunk elastic deformation suited to allowing the inflation valve to be mounted through the orifice in the rim.

3. The electronic unit as claimed in claim 1, wherein the inflation valve is an inflation valve of the "clamp-in" type, comprising:
    a valve body made of a metallic material, provided with a longitudinal axial bore and intended to extend through an orifice made in the rim, said valve body comprising an abutment head for butting against the rim, which head is separated from the trunk by a seal allowing the valve body to be positioned in an airtight manner in the orifice made in said rim,
    and a clamping nut allowing the inflation valve to be fixed in the orifice formed in said rim.

4. The electronic unit as claimed in claim 1, wherein the spring-effect elastic means comprises a spring.

5. The electronic unit as claimed in claim 4, wherein the spring is fixed, on the one hand, to the frontal face of the abutment head of the inflation valve that is positioned facing the electronic casing and, on the other hand, to the pivoting insert.

6. The electronic unit as claimed in claim 4, wherein the spring works in compression.

7. The electronic unit as claimed in claim 4, wherein the spring works in tension.

8. The electronic unit as claimed in claim 1, wherein the spring-effect elastic means comprises an elastomer ring.

9. The electronic unit as claimed in claim 8, wherein the elastomer ring is formed by overmolding the pivoting insert.

10. The electronic unit as claimed in claim 1, wherein the means of assembling the sleeve of the electronic casing and the insert of the valve body comprises a screw.

11. The electronic unit as claimed in claim 5, wherein the spring works in compression.

12. The electronic unit as claimed in claim 5 wherein the spring works in tension.

* * * * *